United States Patent
Qu (12) United States Patent (10) Patent No.: US 8,379,648 B1
Qu (45) Date of Patent: Feb. 19, 2013

(54) METHOD AND SYSTEM FOR AUTOMATIC MAPPING OF DATA FLOW

(75) Inventor: Jian Qiu Qu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1620 days.

(21) Appl. No.: 10/790,915

(22) Filed: Mar. 2, 2004

(51) Int. Cl.
*H04L 12/56* (2006.01)
(52) U.S. Cl. .................... 370/395.31; 370/235
(58) Field of Classification Search .......... 370/229–230, 370/235, 236.2, 241.1, 254, 395, 395.2–395.21, 370/395.31, 397–399
See application file for complete search history.

(56) References Cited

U.S. PATENT DOCUMENTS

| | | | | |
|---|---|---|---|---|
| 5,453,979 A * | 9/1995 | Schibler et al. | ........... | 370/395.32 |
| 5,463,621 A * | 10/1995 | Suzuki | ........... | 370/399 |
| 5,513,178 A * | 4/1996 | Tanaka | ........... | 370/395.3 |
| 5,583,863 A * | 12/1996 | Darr et al. | ........... | 370/397 |
| 6,009,103 A * | 12/1999 | Woundy | ........... | 370/401 |
| 6,023,464 A * | 2/2000 | Woundy | ........... | 370/352 |
| 6,396,837 B1 * | 5/2002 | Wang et al. | ........... | 370/395.21 |
| 6,396,838 B1 * | 5/2002 | Palnati | ........... | 370/395.31 |
| 6,542,266 B1 * | 4/2003 | Phillips et al. | ........... | 398/54 |
| 6,661,795 B1 * | 12/2003 | Adas et al. | ........... | 370/395.1 |
| 6,731,604 B1 * | 5/2004 | Chugo et al. | ........... | 370/238 |
| 6,891,825 B1 * | 5/2005 | O'Dell et al. | ........... | 370/352 |
| 6,952,428 B1 * | 10/2005 | Necka et al. | ........... | 370/466 |
| 6,993,048 B1 * | 1/2006 | Ah Sue | ........... | 370/493 |
| 7,219,124 B2 * | 5/2007 | Cerami et al. | ........... | 709/203 |
| 7,263,557 B2 * | 8/2007 | Lund et al. | ........... | 709/228 |
| 7,289,488 B2 * | 10/2007 | Qu | ........... | 370/352 |
| 2001/0015978 A1 * | 8/2001 | Blanset et al. | ........... | 370/395 |
| 2001/0032265 A1 * | 10/2001 | Tanaka | ........... | 709/227 |
| 2002/0071440 A1 * | 6/2002 | Cerami et al. | ........... | 370/404 |
| 2002/0150108 A1 * | 10/2002 | Nattkemper et al. | ........ | 370/397 |
| 2003/0076835 A1 * | 4/2003 | Lund | ........... | 370/395.2 |
| 2003/0145081 A1 * | 7/2003 | Lau et al. | ........... | 709/224 |
| 2003/0193953 A1 * | 10/2003 | Drort et al. | ........... | 370/395.1 |
| 2004/0052263 A1 * | 3/2004 | Xu | ........... | 370/399 |
| 2004/0095814 A1 * | 5/2004 | Leyrer | ........... | 365/200 |
| 2004/0136394 A1 * | 7/2004 | Onno et al. | ........... | 370/438 |
| 2004/0228363 A1 * | 11/2004 | Adamczyk et al. | ......... | 370/468 |
| 2005/0033853 A1 * | 2/2005 | Jones et al. | ........... | 709/230 |
| 2007/0022469 A1 * | 1/2007 | Cooper et al. | ........... | 726/3 |
| 2007/0086477 A1 * | 4/2007 | Xiong et al. | ........... | 370/463 |

OTHER PUBLICATIONS

D. Grossman, J. Heinanen, Telia; "*Multiprotocol Encapsulation over ATM Adaptation Layer 5*"; Network Working Group Standards Track; (pp. 1-23), Sep. 1999.

\* cited by examiner

*Primary Examiner* — Michael Thier
*Assistant Examiner* — Curtis A Alia
(74) *Attorney, Agent, or Firm* — Baker Botts LLP (57) ABSTRACT

According to one embodiment of the invention, a method for automatically mapping data flow is provided. The method includes receiving, over a path and at a digital subscriber line access multiplexer, a data cell from a party. The digital subscriber line access multiplexer has a database. The method also includes identifying the path and the party from the data cell. The method also includes determining that the database does not correlate the path and the party. The method also includes correlating the party with the path in the database in response to determining that the database does not correlate the path and the party.

31 Claims, 4 Drawing Sheets

METHOD AND SYSTEM FOR AUTOMATIC MAPPING OF DATA FLOW

TECHNICAL FIELD OF THE INVENTION

This invention relates generally to communications and more particularly to a method and system for automatic mapping of data flow.

BACKGROUND OF THE INVENTION

Many homes and businesses access a communications network, such as the Internet, over a digital subscriber line ("DSL") instead of a traditional dial-up connection. Like a dial-up connection, DSL connects a user equipment to the Internet over existing telephone lines. However, DSL may allow data transfer rate of up to 6.1 megabytes per second, which is faster than a traditional dial-up connection. The communications equipment of the users that are designed to benefit from the DSL technology are generally referred to as a customer premise equipment ("CPE"). To access a communications network, a CPE is generally required to establish a permanent virtual circuit ("PVC") with a digital subscriber line access multiplexer ("DSLAM") located at a central office. The DSLAM functions as a bridge between a communications network and the CPE.

To enable a CPE to establish a PVC with the DSLAM, the CPE is generally pre-programmed with a certain set of PVC identifiers and their associated media access control ("MAC") addresses. Once the CPE is coupled to a telephone line at the customer premise but prior to starting the DSL service, an operator at the central office is generally required to manually configure the DSLAM ports to match the pre-programmed configurations of the CPE so that the DSLAM may properly route data to the CPE.

SUMMARY OF THE INVENTION

According to one embodiment of the invention, a method for automatically mapping data flow is provided. The method includes receiving, over a path and at a digital subscriber line access multiplexer, a data cell from a party. The digital subscriber line access multiplexer has a database. The method also includes identifying the path and the party from the data cell. The method also includes determining that the database does not correlate the path and the party. The method also includes correlating the party with the path in the database in response to determining that the database does not correlate the path and the party.

Some embodiments of the invention provide numerous technical advantages. Other embodiments may utilize some, none, or all of these advantages. For example, according to one embodiment, the cost of initiating ATM-based communications service for a customer is lowered by automatically mapping the data flow between the DSLAM and the CPE. In another embodiment, old data mapping information at the DSLAM may be updated as a part of the automatic updating process, which increases efficiency and cost of providing communications service. In another embodiment, the cost of initiating communications service, such as DSL service, is lowered by eliminating manual configuration of DSLAM.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Figure 1:
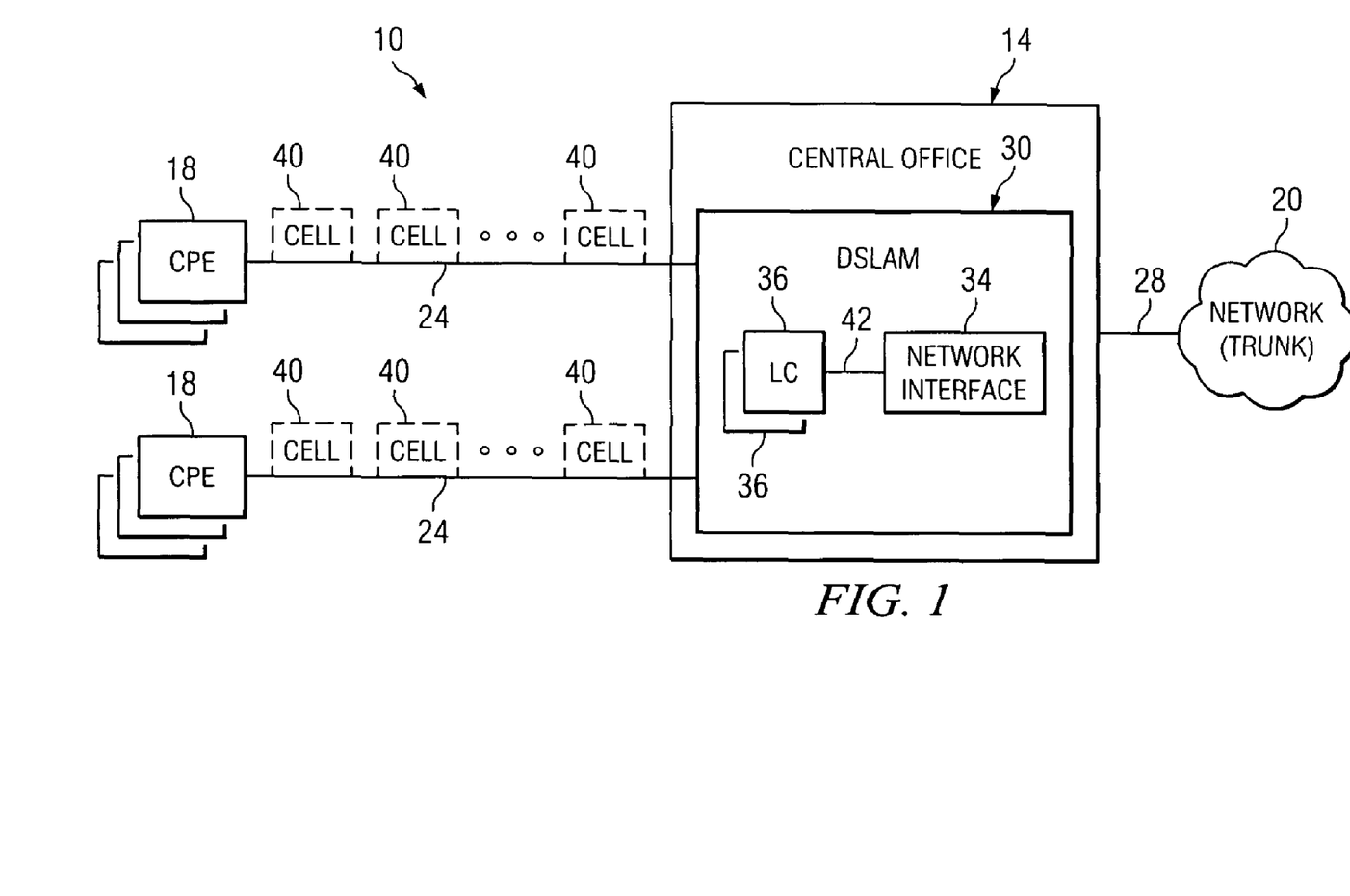
FIG. 1 is a schematic diagram illustrating one embodiment of a digital subscriber line communications system.
Figure 2A:
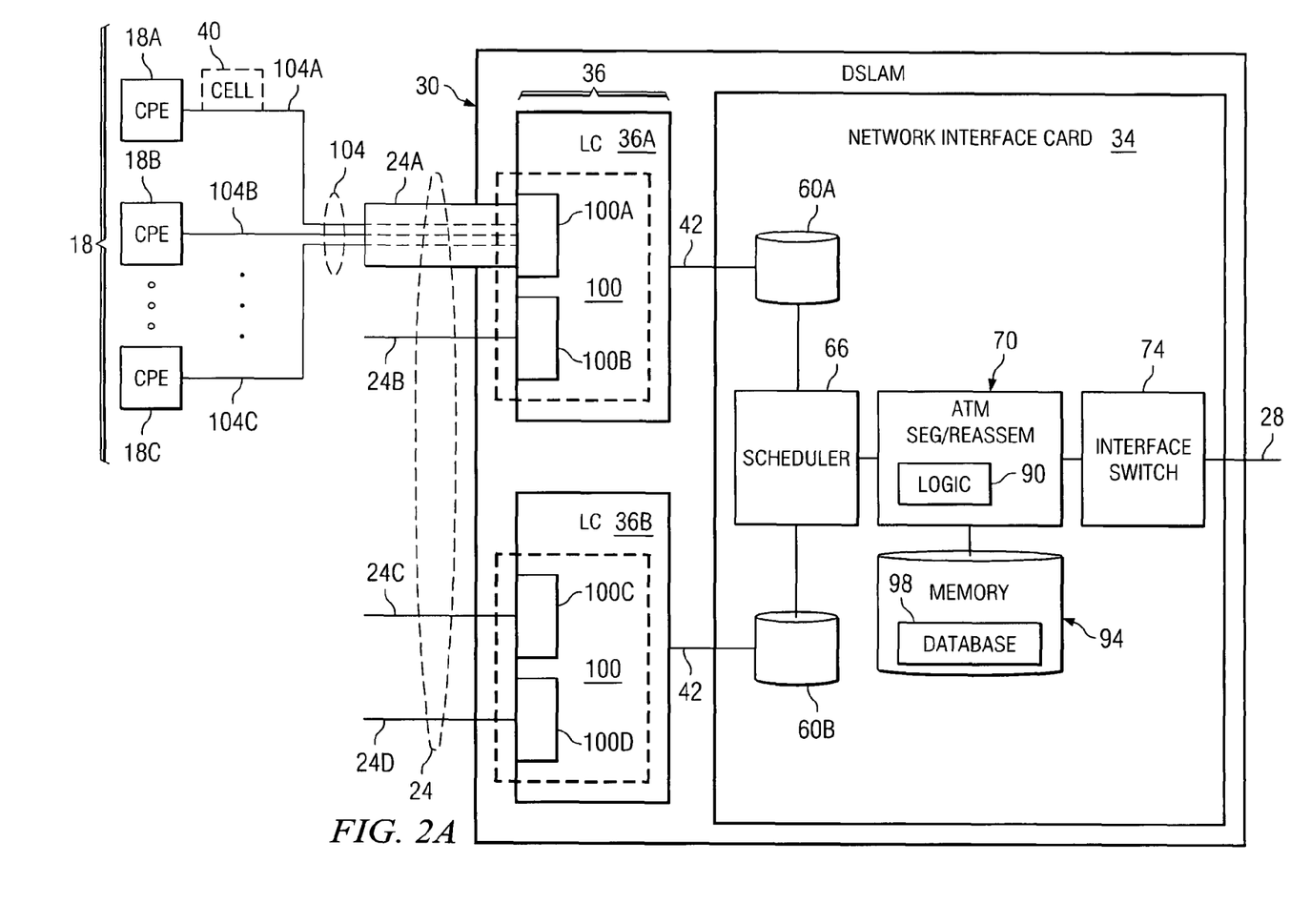
FIG. 2A is a schematic diagram illustrating one embodiment of a digital subscriber line access multiplexer shown in FIG. 1.
Figure 2B:
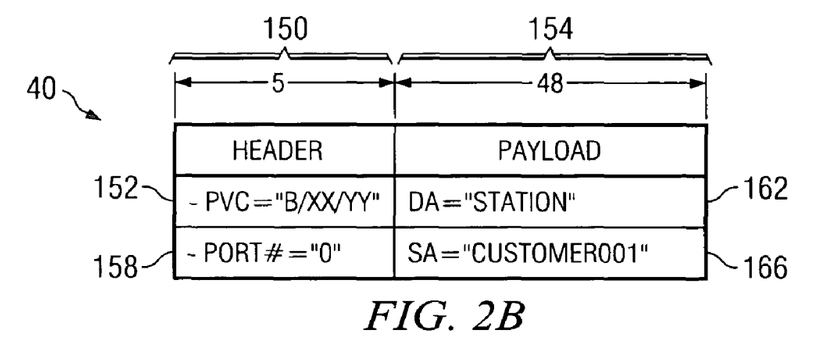
FIG. 2B is a schematic diagram illustrating one embodiment of the data cell shown in FIG. 2A.
Figure 2C:
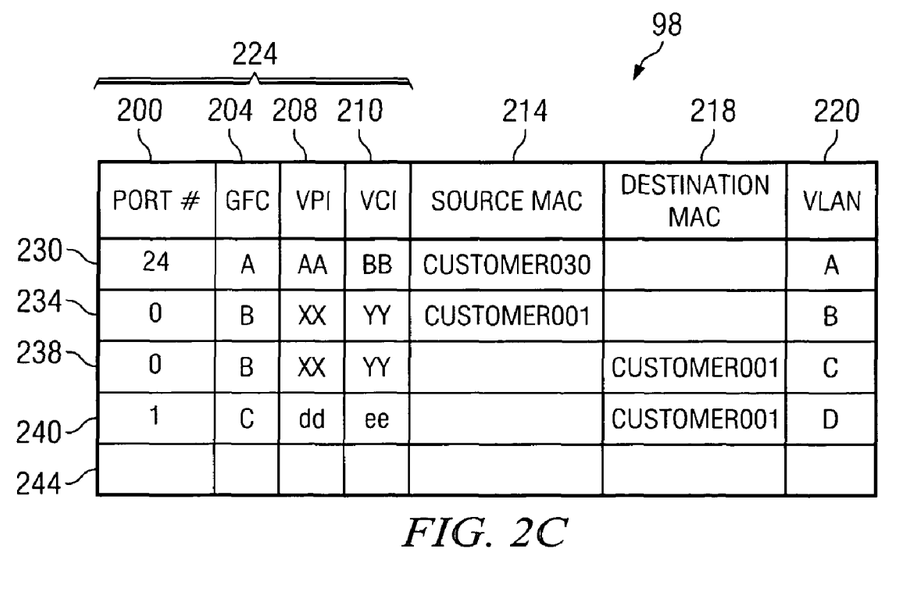
FIG. 2C is a schematic diagram illustrating one embodiment of a database stored in the DSLAM shown in FIG. 2A.
Figure 3:
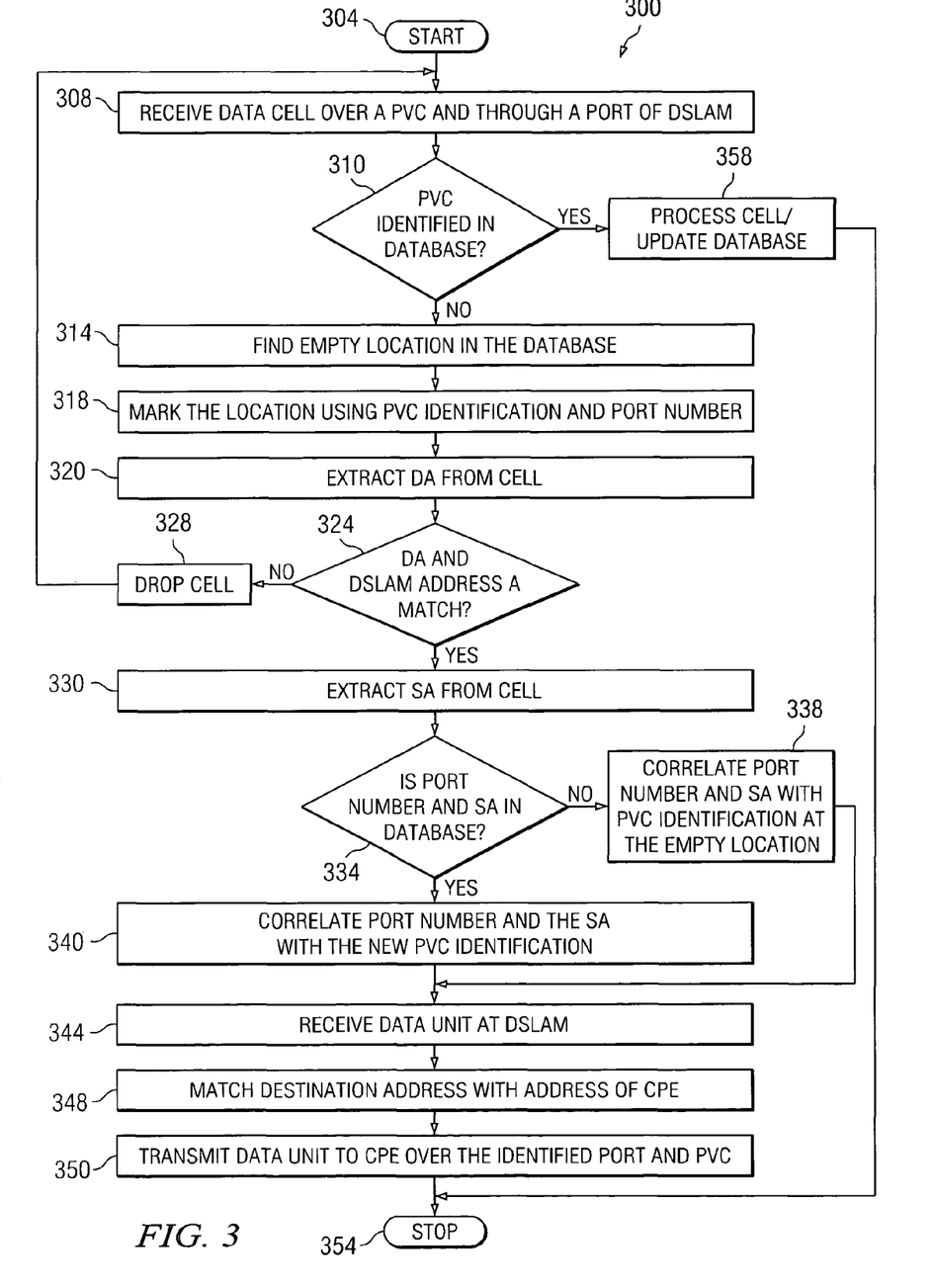
FIG. 3 is a block diagram illustrating one embodiment of a method for automatically mapping data flow.

Embodiments of the invention are best understood by referring to FIGS. 1 through 3 of the drawings, like numerals being used for like and corresponding parts of the various drawings.

FIG. 1 is a block diagram of a communication system 10 that may benefit from the teachings of the present invention. System 10 includes a central office 14, a plurality of customer premise equipment ("CPE") 18 and a network 20, such as an Internet protocol network. CPE 18 are coupled to central office 14 by a plurality of physical lines 24, such as telephone lines. Central office 14 is coupled to network 20 by a trunk line 28. Trunk line 28 may be any suitable communication link that may carry Internet protocol traffic, including Ethernet, OC3, DS3, and T1 (STM 1, E3, E1, in Europe).

Central office 14 comprises, among other components not explicitly shown, a digital subscriber line access multiplexer ("DSLAM") 30. DSLAM 30 allows communication between customer premises 18 and network 20 using digital line subscriber ("DSL") technology, which may be faster than a traditional dial-up connection. DSLAM 30 comprises, in this example, a network interface card 34 and line cards 36. Although FIG. 1 shows two line cards 36, more or less line cards may be utilized. Line cards 36 are coupled to network interface card 34 by a line 42. Line 42 is operable to carry data between network interface card 34 and line cards 36.

In operation, network interface card 34 communicates with network 20 over trunk line 28. Network interface card 34 receives data from network 20 over trunk line 28 and communicates it to a particular one of line cards 36 that is associated with the intended destination of the data. Conversely, network interface card 34 receives data from line cards 36 and communicates it over trunk line 28 to network 20. In one embodiment, network interface card 34 also contains the IP/ATM switch fabric (shown and discussed in conjunction with FIG. 2A) that manages and processes packets and cells. Network interface card 34 manages DSLAM 30, including system help, system performance, switch help and performance, and network communications.

Line cards 36 receive communication data 40 over telephone lines 24 from CPE 18 and communicate that information to network interface card 34 for eventual transmission to network 20. Conversely, line cards 36 receive data 40 through network interface card 34 from network 20 and communicate data 40 to the appropriate CPE over lines 24. Each line 24 is coupled to a particular port of line card 36. Each line 24 may be used to couple multiple CPE 18 with line card 36 by forming respective multiple permanent virtual circuits ("PVC") (shown and discussed in conjunction with FIG. 2A) over line 24. Thus, each PVC couples a particular CPE 18 to a port of line card 36.

Conventionally, a CPE is pre-programmed with a certain set of PVC identifiers and their associated media access control ("MAC") addresses for establishing a PVC with a line card of a DSLAM. Generally, the set of PVC identifiers and MAC addresses for a CPE are obtained from an agreement between a DSLAM manufacturer and the CPE manufacturer. While the CPE may be able to establish a PVC with the DSLAM according to the CPE's pre-programmed information and send data to the DSLAM over the PVC, the DSLAM has no information concerning how the data destined for the CPE should be sent. To enable the DSLAM to correctly distribute data to multiple CPE, an operator at the central office is generally required to manually configure the DSLAM for each CPE coupled to the DSLAM so that the DSLAM has appropriate information to send data over a path that can reach the CPE. Providing information regarding a path that can reach a CPE may be referred to as "mapping" or "data mapping."

According to one embodiment of the invention, a method and system are provided for automatically mapping data flow for a DSLAM by designating the PVC that CPE 18 established as a data path for sending data from the DSLAM to the CPE. In one embodiment, the cost of initiating ATM-based communications service for a customer is lowered by automatically mapping the data flow between a DSLAM and a CPE. In another embodiment, old data mapping information at a DSLAM may be updated as a part of the automatic updating process, which increases efficiency and cost of providing communications service, such as DSL service. Some embodiments of the invention may utilize some, none, or all of these advantages. Some embodiments may include a program operable, when executed using a processor of a computing system having a database, to perform the operations disclosed herein.

FIG. 2A is a block diagram illustrating additional details of one embodiment of DSLAM 30 capable of automatically mapping data flow between CPE 18 and DSLAM according to some embodiments of the invention. In one embodiment, DSLAM 30 comprises line cards 36A and 36B (collectively referred to as line cards 36) coupled to network interface card 34. Network interface card 34 comprises buffers 60A and 60B (collectively referred to as buffers 60), a scheduler 66, an ATM segmentation/reassembly switch ("ATM switch") 70 having a logic unit 90, a memory 94 having a database 98 that is accessible to logic unit 90, and an interface switch 74. Buffer 60A is coupled to line card 36A and Buffer 60B is coupled to line card 36B. Buffers 60 are also coupled to scheduler 66. Scheduler 66 and memory 94 are coupled to ATM switch 70, and ATM switch 70 is coupled to interface module 74.

Line card 36A comprises ports 100A and 100B. Line card 36B comprises ports 100C and 100D. Ports 100A-100D are collectively referred to as ports 100. The number of line cards 36, ports 100, and buffers 60 may vary depending on the design specification of DSLAM 30. For example, in one embodiment, each line card 36 may comprise 256 ports 100 each having unique port numbers ("0"-"255," for example). The way in which each port 100 and each line card 36 are identified may also vary. For example, each port may be identified using numbers, letters, or any other suitable method or combination of methods.

Each port 100 of line card 36 is coupled to one or more CPE 18 through a particular line 24. For example, port 100A is coupled to CPE 18A through line 24A, port 100B is coupled to CPE 18B through line 24B, port 100C is coupled to CPE 18C through line 24C, and port 100D is coupled to CPE 18D through line 24D. Lines 24A-24D are collectively referred to as line 24, and CPE 18A-18C are collectively referred to as CPE 18. Each line 24 allows multiple permanent virtual circuits ("PVC") 104 to be formed by one or more CPE 18, where each PVC 104 couples a particular CPE 18 to port 100. For example, as shown in FIG. 2A, CPE 18A-18C are coupled to port 100A over PVC 104A-104C (collectively referred to as PVC 104), respectively.

Line card 36 is operable to receive data cells 40 from one or more CPE 18 over their respective PVC 104 at each port 100 and forward the received data cells 40 to buffer 60 for storage. Buffer 60 is operable to store received data cells 40. Scheduler 66 is operable to route data cells 40 stored in buffer 60 to ATM switch 70 according to an appropriate schedule. ATM switch 70 is operable to convert data from interface switch 74 into ATM cells or convert data received from scheduler 66 into a format appropriate for transmission to network 20 shown in FIG. 1. According to one embodiment of the invention, logic 90 is operable to automatically map the data flow between each CPE 18 and DSLAM 30 by recording information in database 98 that correlates the addressing information in each data cell 40 with the respective CPE 18 that transmitted the data cell 40. Additional details concerning logic unit 90 are provided below and also in conjunction with FIG. 3. Additional details concerning data cell 40 and database 98 are provided below in conjunction with FIGS. 2B and 2C, respectively.

FIG. 2B is a schematic diagram illustrating one embodiment of data cell 40 shown in FIG. 2A. Referring to FIG. 2B, data cell 40 comprises a header 150 and a payload section 154. Data cell 40 is in an ATM format and has 53 bits of data. As shown in FIG. 2B, five bytes are allocated in header 150 and the remaining 48 bytes are allocated in payload section 154. Header 150 that includes administrative information, such as an identifier 152 of a particular PVC 104 over which data cell 40 is transmitted, and a port number 158 that identifies a particular port 100 associated with the PVC 104 identified by PVC identifier 152.

Payload section 154 may include data, as well as a source address 166 identifying a sender of data cell 40 and a destination address 162 identifying a receiver of data cell 40. For purposes of illustration, the following identifiers are assigned: CPE 18A is identified as "CUSTOMER 001," DSLAM 30 is identified as "STATION," PVC 104A is identified as "B/xx/yy," and port 100A is identified by "0." However, CPE 18A, DSLAM 30, PVC 104A, and port 100A may be identified using any suitable identifier. As shown in FIG. 2B, payload section 154 of data cell 40 includes "CUSTOMER 001" as source address 166 and "STATION" as destination address 162. Header 150 of data cell 40 includes "0" as port number 158 and "B/xx/yy" as PVC identifier 152. In one embodiment, PVC identifier 152 is a combination of generic flow control ("GFC") information, a virtual path identifier ("VPI"), and a virtual connection identifier ("VCI"). However, other identifier or a combination of identifiers may be used to identify PVC 104A. In the example used here, "B" is the GFC, "xx" is the VPI, and "yy" is the VCI.

FIG. 2C is a schematic diagram illustrating one embodiment of a database 98 shown in FIG. 2A. Database 98 comprises a column 200 for storing port numbers, a column 204 for storing GFC information, a column 208 for storing VPI, a column 210 for storing VCI, a column 214 for storing source addresses, a column 218 for storing destination addresses, and, where appropriate, a column 220 for storing virtual local access network identifiers ("VLAN TAG"). Information in columns in 204, 208, and 210 identify a particular PVC 104, and are collectively referred to as column 224. Database 98 also includes rows 230 through 244. Each of rows 230 through 244 correlates a particular PVC 104 with a particular CPE 18 using suitable identifiers. Although database 98 is shown as having columns 200-220 and rows 230-244, more or less columns and rows may be used map data flow.

An example operation of DSLAM 30 in FIG. 2A is described using data cell 40 of FIG. 2B and database 98 of FIG. 2C. Referring again to FIG. 2A, CPE 18A initiates communication with DSLAM 30 over line 24A. Line card 36A, which is coupled to line 24A through port 100A, allows CPE 18A to establish PVC 104A. After PVC 104A is established, CPE 18A transmits one or more data cells 40 shown in FIG. 2B to port 100A over PVC 104A. Line card 36A then sends data cells 40 to network interface card 34 so that data cells 40 may be converted into a proper format for transmission to network 20, which is shown in FIG. 1. Buffer 60A of network interface card 34 receives data cells 40 from line card 36A and stores data cells 40 until scheduler 66 forwards data cells 40 to ATM switch 70.

After receiving data cell 40 from scheduler 66, logic unit 90 of ATM switch 70 automatically identifies PVC 104A by reading PVC identifier 152, which is shown in FIG. 2B. For example, as shown in FIG. 2B, "B/xx/yy" is read by logic unit 90. Then logic unit 90 searches for "B/xx/yy" in database 98. Database 98 may contain existing mapping information for some CPE 18. For example, row 230, columns 224 of database 98 shown in FIG. 2C identifies a particular PVC as "A/AA/BB". As shown in row 230 of database 98, PVC identified as "A/AA/BB" is associated with port number "24" and correlated to a particular CPE 18 identified as "CUSTOMER 030." Thus, the information in row 230 of database 98 indicates that CPE 18 identified as "CUSTOMER 030" uses PVC 104 identified as "A/AA/BB" associated with port number 24 to transmit data cells to DSLAM 30.

Referring back to FIG. 2A, if logic unit 90 does not find "B/xx/yy," then logic unit 90 finds an empty location, such as row 244 of database 98 shown in FIG. 2C, for entering new data mapping information. Empty locations, such as row 244, may also be referred to as "empty data space." Logic unit 90 then marks, or "indexes" the empty location of database 98 using PVC identifier 152 and port number 158, shown in FIG. 2B. For example, as shown in row 234 of database 98, columns 200, 204, 208, and 210 are respectively filled with "0," "B," "xx," and "yy." Logic unit 90 also reads destination address 162 to determine whether data cell 40 was intended to be received at DSLAM 30. As shown in FIG. 2B, destination address 162 in data cell 40 is identified as "STATION," and because DSLAM 30 is named "STATION" in this example, logic unit 90 determines that DSLAM 30 is the intended receiver of data cell 40. If destination address 162 does not match the address of DSLAM 30, then DSLAM 30 may drop the received data cell 40.

After determining that destination address 162 of data cell 40 is a match with the address of DSLAM 30, logic unit 90 reads source address 166 from data cell 40. Logic unit 90 then determines whether port number 158 and source address 166 of data cell 40 are in database 98. If port number 158 and source address 166 are found in database 98, then it may indicate that the particular CPE 18 identified by source address 166 may have communicated with DSLAM 30 previously using a different PVC 104. An example of such an entry is shown in row 240 of database 98. While the port number is indicated as "0" and the source address is indicated as "CUSTOMER 001," the PVC identifier is indicated as "C/dd/ee," as shown in row 240. This indicates that "CUSTOMER 001," which is CPE 18A, may have been designated to use a PVC identified as "C/dd/ee" to communicate with DSLAM 30, but is now using PVC 104A, which is identified as "B/xx/yy." Thus, logic unit 90 updates the entry of "C," "dd," and "ee" with "B," "xx," and "yy" to correlate CPE 18A with the most recent PVC. If port number 158 and source address 166 are not found in database 98, then logic unit 90 enters source address 166 in the indexed empty data space using PVC identifier 152 and port number 158 found in data cell 40. Thus, PVC identifier 152 is correlated with source address 166, thereby correlating PVC 104A with CPE 18A. An example of these entries are found in row 234 of database 98 shown in FIG. 2C.

Logic unit 90 may also duplicate the entry in row 234 but enter source address 166 of "CUSTOMER 001" as a destination address. An example of such a duplication is shown in row 238 of database 40. By correlating PVC 104A with CPE 18A as a destination, ATM switch 70 is operable to receive data from network 20 that is destined for CPE 18A and send the data to CPE 18A using PVC 104A. For example, if ATM 70A receives data with a destination address of "CUSTOMER 001," then logic unit 90 may search column 218 of database 98 shown in FIG. 2C to determine that data having a destination address of "CUSTOMER 001" should be sent over PVC 104A identified as "B/xx/yy" through port number "0." Therefore, the data flow between CPE 18A and DSLAM 30 is automatically mapped.

FIG. 3 is a block diagram illustrating one embodiment of a method 300 for automatically mapping data flow. Method 300 may be implemented using any suitable device or a combination of devices. For example, method 300 may be implemented using logic unit 90. One embodiment of method 300 is described using DSLAM 30, data cell 40, and database 98 of FIGS. 2A-2C, respectively.

Method 300 starts at step 304. At step 308, data cell 40 shown at FIG. 2B is received at DSLAM 30. At step 310, logic unit 90 determines whether database 98 contains any information regarding PVC 104A. If yes, then "yes" branch is followed to step 358. If no, then "no" branch is followed to step 314, where logic unit 90 finds an empty location in database 98. An example of an empty location is shown as row 244 of database 98 in FIG. 2C. At step 318, the empty location is marked or "indexed" using PVC identifier 152 and port number 158. In this example, "B/xx/yy" and "0" shown in data cell 40 of FIG. 2B are used to fill column 224 of an identified empty row. Column 224 is shown in FIG. 2C.

At step 320, destination address 162 of data cell 40 is read by logic unit 90. At step 324, logic unit 90 determines whether destination address 162 matches the address of DSLAM 30. If the address does not match, then "no" branch is followed to step 328 where data cell 40 is dropped, and method 300 returns to step 308. If destination address 162 matches the address of DSLAM 30, then "yes" branch is followed to step 330 where logic unit 90 reads source address 166 from data cell 40. At step 334, logic unit 90 determines if port number 158 and source address 166 are found in database 98. If yes, then "yes" branch is followed to step 340. At step 340, logic unit 90 correlates port identifier 152 and source address 166 found in database 98 with PVC identifier 152 found in data cell 40. Logic unit 90 may replace any existing PVC identifier that was correlated with source address 166 and port identifier 152.

Referring again to step 334, if port number 158 and source address 166 are not found in database 98, then "no" branch is followed to step 338. At step 338, logic unit 90 correlates port number 158 and source address 166 with PVC identifier 152 by entering PVC identifier 152 into the empty data space that was indexed at step 318. An example of such a correlation is found in row 234 of database 98 shown in FIG. 2C. In one embodiment, at step 338, logic unit 90 may duplicate the correlation between PVC identifier 152 and CPE 18A for directing data from network 20 shown in FIG. 1 to CPE 18A. For example, as shown in row 238 of database 98 shown in FIG. 2C, source identifier 166 may be entered into destination address column 218 of row 238.

At step 344, DSLAM 30 receives data intended for CPE 18A from network 20 shown in FIG. 1. At step 348, logic unit 90 matches the destination address embedded in the data received from network 20 to the address of CPE 18A. For example, the embedded destination address may be "CUSTOMER 001," which identifies CPE 18A shown in FIG. 2A. Logic unit 90 may look through destination address column 218 of database 98 and find "CUSTOMER 001" in row 238 of database 98 as correlated with port number "0," PVC identifier "B/xx/yy," as shown in FIG. 2C. At step 350, logic unit 90 directs the received data to be transmitted to CPE 18A over PVC 104A, which is identified as "B/xx/yy."

Referring back to step 358, when logic unit 90 finds an entry in database 98 that matches PVC identifier 152 found in data cell 40, then logic unit 90 may update any entry in database 98 that is correlated with PVC identifier 152. For example, if "B/xx/yy" is found in one of rows 230-244 of database 98 shown in FIG. 2C, but that entry is correlated with a port number and an address that is different from the ones found in the received data cell 40, then those entries are updated using port number 158 and source address 166 found in the most recently received data cell 40. Method 300 stops at step 354. Although one embodiment of method 300 has been described using devices that may be used to communicate using DSL technology, method 300 may be used in conjunction with any ATM-based communications technology.

Although some embodiments of the present invention have been described in detail, it should be understood that various changes, substitutions, and alterations can be made hereto without departing from the spirit and scope of the invention as defined by the appended claims.

What is claimed is:

1. A method for automatically mapping data flow, comprising:
   providing a database identifying a plurality of data paths and a plurality of communications devices, each data path correlated to a particular one of the communications devices, the database having an empty space;
   receiving an ATM cell from a customer device over a permanent virtual circuit, the permanent virtual circuit associated with a port of a digital subscriber line access multiplexer having a multiplexer address, the ATM cell having a source address identifying the customer device, a destination address identifying the digital subscriber line access multiplexer, a circuit identifier identifying the permanent virtual circuit, and a port number identifying the port;
   dropping the ATM cell upon determining that the destination address does not match the multiplexer address;
   determining that the circuit identifier is not found among the data paths identified in the database;
   indexing a row in the empty space in the database using the port number and the circuit identifier;
   determining that the source address and the port number are not found in the database; and
   in response to determining that the source address and the port number are not found, recording the source address from the received ATM cell in the row indexed by the port number and the circuit identifier, thereby correlating the source address, the port number, and the circuit identifier in the indexed empty space of the database.

2. A method for automatically mapping data flow, comprising:
   providing a database identifying a plurality of data paths and a plurality of communications devices, each data path correlated to a particular one of the communications devices, the database having an empty space;
   receiving an ATM cell from a customer device over a permanent virtual circuit, the permanent virtual circuit associated with a port of a digital subscriber line access multiplexer having a multiplexer address, the ATM cell having a source address identifying the customer device, a destination address identifying the digital subscriber line access multiplexer, a circuit identifier identifying the permanent virtual circuit, and a port number identifying the port;
   dropping the ATM cell upon determining that the destination address does not match the multiplexer address;
   determining that the circuit identifier is not found among the data paths identified in the database;
   indexing the empty space in the database using the port number and the circuit identifier;
   determining that the source address and the port number are not found in the database;
   in response to determining that the source address and the port number are not found, correlating the source address with the port number and the circuit identifier in the indexed empty space of the database;
   after correlating the source address with the circuit identifier, receiving a data unit having a destination identifier identifying the customer device;
   determining that the destination identifier matches the source address in the database;
   reading, from the database, the port number and the circuit identifier correlated with the source address; and
   sending the data unit to the customer device through the port and the permanent virtual circuit respectively identified by the port number and the circuit identifier.

3. The method of claim 2, wherein the data unit is an Ethernet packet.

4. The method of claim 1, wherein the circuit identifier comprises generic flow control information, a virtual path identifier, and a virtual connection identifier.

5. A method for automatically mapping data flow, comprising:
   receiving a data cell from a party over a path and at a port of a digital subscriber line access multiplexer;
   after receiving the data cell, identifying the path and the party from the data cell;
   after identifying the path and the party, recording the part, the path, and the port of the digital subscriber line access multiplexer in a row of a database;
   after recording the party, the path, and the port of the digital subscriber line access multiplexer in the row of the database, receiving a data unit at the digital subscriber line access multiplexer, the data unit having a destination identifier identifying the party as a destination;
   determining, by matching the destination identifier with an identifier in the database identifying the party, that the path is correlated with the party; and
   in response to the determination, transmitting the data unit over the path to the party.

6. The method of claim 5, wherein the data unit is an Ethernet packet.

7. The method of claim 5, wherein the path comprises a permanent virtual circuit.

8. The method of claim 5, wherein recording the party, the path, and the port of the digital subscriber line access multiplexer comprises recording the party, the path, and the port of the digital subscriber line access multiplexer for the first time in a database of the digital subscriber line access multiplexer.

9. The method of claim 5, wherein identifying the path comprises identifying the port of the digital subscriber line access multiplexer and a permanent virtual circuit associated with the port.

10. The method of claim 5, wherein identifying the path and the party comprises determining that the data cell includes a destination address identifying the digital subscriber line access multiplexer.

11. The method of claim 5, and further comprising indexing, after identifying the path, a row in an empty space in the database with a circuit identifier identifying the path and a port number identifying the port of the digital subscriber line access multiplexer, the port associated with the path, and wherein recording the party, the path, and the port in the row of the database comprises recording a party identifier identifying the party in the indexed row of the empty space.

12. The method of claim 5, wherein the path is a permanent virtual circuit and the party is a device operable to establish a digital subscriber line connection with the digital subscriber line access multiplexer.

13. The method of claim 5, and further comprising finding, after identifying the path and the party from the data cell, a correlation between the party and a second path in the database, and wherein correlating the party with the path comprises updating the correlation by correlating the party with the second path.

14. The method of claim 5, and further comprising finding, after identifying the path and the party from the data cell, a correlation between the path and a second party in the database, and wherein recording the party, the path, and the port of the digital subscriber line access multiplexer in the row of the database comprises updating the row by recording the second party, the path, and the port of the digital subscriber line access multiplexer in the row.

15. The method of claim 5, wherein the path comprises a permanent virtual circuit associated with the port, and wherein recording the party, the path, and the port of the digital subscriber line access multiplexer comprises finding a correlation between the port and another party, and in response to the finding, updating the correlation by recording the port with the party.

16. The method of claim 5, wherein the path comprises a permanent virtual circuit, and identifying the path and the party comprises identifying the path before the party, and further comprising:
  determining, after identifying the path but before identifying the party, that the permanent virtual circuit is not associated with any party; and
  wherein recording the party, the path, and the port in the row of the database comprises recording the party, the path, and the port in response to determining that the permanent virtual circuit is not associated with any party.

17. A method for automatically mapping data flow, comprising:
  receiving, over a path and at a port of a digital subscriber line access multiplexer, a data cell from a party, the digital subscriber line access multiplexer having a database;
  identifying the path and the party from the data cell;
  identifying the port;
  determining that the database does not correlate the path and the port of the digital subscriber line access multiplexer with the party; and
  in response to determining that the database does not correlate the path and the port of the digital subscriber line access multiplexer with the party:
    indexing a row in an empty space in the database using an identifier identifying the port and the permanent virtual circuit; and
    recording the party, the path, and the port of the digital subscriber line access multiplexer in the row of the database and recording a party identifier identifying the party in the row indexed by identifier identifying the port and the permanent virtual circuit;
  wherein the path comprises a permanent virtual circuit associated with the port of the digital subscriber line access multiplexer.

18. The method of claim 17, wherein the path is a permanent virtual circuit coupled to the port of the digital subscriber line access multiplexer, and further comprising:
  identifying the port; and wherein determining that the database does not correlate the path and the port of the digital subscriber line access multiplexer with the party comprises determining that the database correlates the party and the port with another permanent virtual circuit.

19. The method of claim 17, wherein the path is a permanent virtual circuit coupled to the port of the digital subscriber line access multiplexer, and further comprising:
  identifying the port; and wherein determining that the database does not correlate the path and the port of the digital subscriber line access multiplexer with the party comprises determining that the database does not correlate the party and the port with any permanent virtual circuit.

20. The method of claim 17, wherein the data cell is an ATM cell.

21. The method of claim 17, wherein the data cell is an ATM cell, and further comprising:
  receiving a data unit at the digital subscriber line access multiplexer, the data unit having a destination identifier identifying the party as a destination;
  determining, by matching the destination identifier with an identifier in the database identifying the party, that the path is correlated with the party;
  converting the data unit into one or more ATM cells; and
  transmitting the one or more ATM cells over the path to the party.

22. The method of claim 21, wherein the data unit is an Ethernet packet.

23. The method of claim 17, wherein the path comprises a permanent virtual circuit.

24. The method of claim 17, wherein recording the party, the path, and the port in the row of the database comprises recording the party, the path, and the port for the first time in the database.

25. The method of claim 17, wherein the path comprises a permanent virtual circuit and the party is a device operable to establish a digital subscriber line connection with the digital subscriber line access multiplexer.

26. A system for automatically mapping data flow, comprising:
  a port operable to receive a data cell at a digital subscriber line access multiplexer from a customer device over a permanent virtual circuit of a digital subscriber line, the digital subscriber line access multiplexer having a multiplexer address and the data cell having a destination address;
  a database; and
  a switch coupled to the port and the database, the switch operable to drop the data cell if the destination address does not match the multiplexer address, to identify the permanent virtual circuit, the port, and the customer device from the data cell, to determine that the database does not correlate the permanent virtual circuit and the port with the customer device, and to record the customer device, the permanent virtual circuit, and the port in a row of the database in response to the determination;

wherein the database comprises an empty space, and wherein the switch is further operable to identify the port, to index a row in the empty space in the database using an identifier identifying the port and the permanent virtual circuit, and to correlate the customer device with the permanent virtual circuit and the port by recording a party identifier identifying the customer device in the row indexed by the identifier identifying the port and the permanent virtual circuit.

27. The system of claim 26, wherein the database identifies a plurality of data paths and a plurality of communications devices, each data path correlated to a particular one of the communications devices, and wherein the switch is operable to search through the data paths identified in the database to determine that the database does not correlate the permanent virtual circuit and the customer device.

28. The system of claim 26, wherein the data cell is an ATM cell, and the switch is an ATM switch further operable to receive a data unit having a destination identifier identifying the customer device as a destination, to determine, using the database, that the permanent virtual circuit and the port is correlated with the customer device, to convert the data unit into one or more ATM cells, and to transmit the one or more ATM cells over the permanent virtual circuit to the customer device in response to determining that the permanent virtual circuit and the port is correlated with the customer device.

29. The system of claim 28, wherein the data unit is an Ethernet packet.

30. An apparatus for automatically mapping data flow, comprising:
   a program embodied in a computer-readable storage medium and operable,
   when executed using a processor of a computing system having a database, to:
   read a data cell received at a port of a digital subscriber line access multiplexer from a customer device over a permanent virtual circuit;
   identify the port of the digital subscriber line access multiplexer, the permanent virtual circuit, and the customer device from the data cell;
   determine that the database does not correlate the permanent virtual circuit and the port of the digital subscriber line access multiplexer with the customer device; and
   record the customer device, the permanent virtual circuit and the port of the digital subscriber line access multiplexer in a row of the database in response to the determination.

31. A method for automatically mapping data flow, comprising:
   receiving, by a digital subscriber line access multiplexer, an ATM cell from a customer device over a permanent virtual circuit, the permanent virtual circuit associated with a port of the digital subscriber line access multiplexer, the ATM cell having a source MAC address identifying the customer device, a destination address identifying the digital subscriber line access multiplexer, a circuit identifier identifying the permanent virtual circuit, and a port number identifying the port;
   accessing, by the digital subscriber line access multiplexer, a database comprising a plurality of entries;
   determining, by the digital subscriber line access multiplexer, that the circuit identifier of the received ATM cell is not found in any of the plurality of entries of the database;
   creating, by the digital subscriber line access multiplexer, a new entry in the database and indexing the new entry using the port number and the circuit identifier of the received ATM cell;
   determining, by the digital subscriber line access multiplexer, that none of the plurality of entries of the database comprise both the source MAC address and the port number of the received ATM cell; and
   in response to determining that none of the plurality of entries of the database comprise both the source MAC address and the port number of the received ATM cell, recording, by the digital subscriber line access multiplexer, the source MAC address in the new entry indexed with the port number and the circuit of the received ATM cell.

* * * * *